United States Patent [19]

Noyes

[11] Patent Number: 5,403,151

[45] Date of Patent: Apr. 4, 1995

[54] LOW PRESSURE PROCESS FOR ENTRAINING GAS INTO LIQUID SOLUTION AND PUMP THEREFORE

[75] Inventor: Daniel G. Noyes, Houston, Tex.

[73] Assignee: U.S. Water Technologies, Inc., Houston, Tex.

[21] Appl. No.: 89,049

[22] Filed: Jul. 9, 1993

Related U.S. Application Data

[63] Continuation of Ser. No. 805,182, Dec. 9, 1991, abandoned.

[51] Int. Cl.$^6$ .............................................. F04D 7/00
[52] U.S. Cl. ..................... 415/182.1; 261/DIG. 75; 417/196
[58] Field of Search ............... 417/76, 80, 87, 89, 417/90, 151, 196; 261/DIG. 75; 366/101, 107, 163; 210/205, 758, 754; 415/115, 116, 182.1, 183

[56] References Cited

U.S. PATENT DOCUMENTS

| | | | |
|---|---|---|---|
| 1,973,714 | 4/1934 | Justheim | 417/196 |
| 3,010,232 | 11/1961 | Shakel et al. | 417/87 |
| 4,037,991 | 7/1977 | Taylor | 417/80 |
| 4,230,570 | 10/1980 | Irving | 261/DIG. 75 |
| 4,230,648 | 10/1980 | Leeuwrik | 261/DIG. 75 |
| 4,259,267 | 3/1981 | Wang | 261/DIG. 75 |
| 4,690,756 | 9/1987 | Van Ry | 261/DIG. 75 |
| 4,710,325 | 12/1987 | Cramer et al. | 261/DIG. 75 |
| 5,261,783 | 11/1993 | Noyes | 415/71 |

Primary Examiner—Edward K. Look
Assistant Examiner—Mark Sgantzos
Attorney, Agent, or Firm—Vaden, Eickenroht, Thompson, Boulware & Feather

[57] ABSTRACT

The invention is a method for entraining gas in a liquid solution and an apparatus for practicing the method. In the method of the invention, gas is introduced into a liquid solution being pumped through a conduit at the point of lowest absolute pressure in the system upstream of the pumping means. The gas is introduced into the liquid as bubbles or gas pockets with as small a diameter as is mechanically possible at the narrowest point of a venturi in the conduit and the increasing liquid pressure in the system downstream of the venturi is utilized to compress the bubbles still further. The bubbles or pockets of gas are prevented from coalescing as they pass through the pumping means and exit the apparatus by the pumping means itself. The apparatus comprises a conduit having a passageway therethrough in which a venturi is formed. An annular chamber is provided in the body of the conduit at the narrowest point of the venturi where the gas is introduced into the liquid. The gas is introduced upstream of a pumping means, which utilizes a shear force to prevent the bubbles from coalescing as the liquid exits the apparatus through the pumping means.

15 Claims, 3 Drawing Sheets

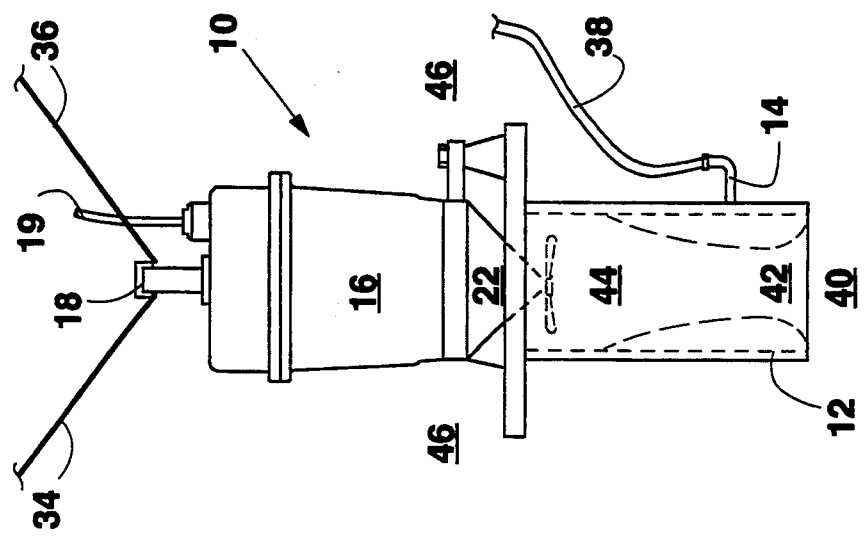
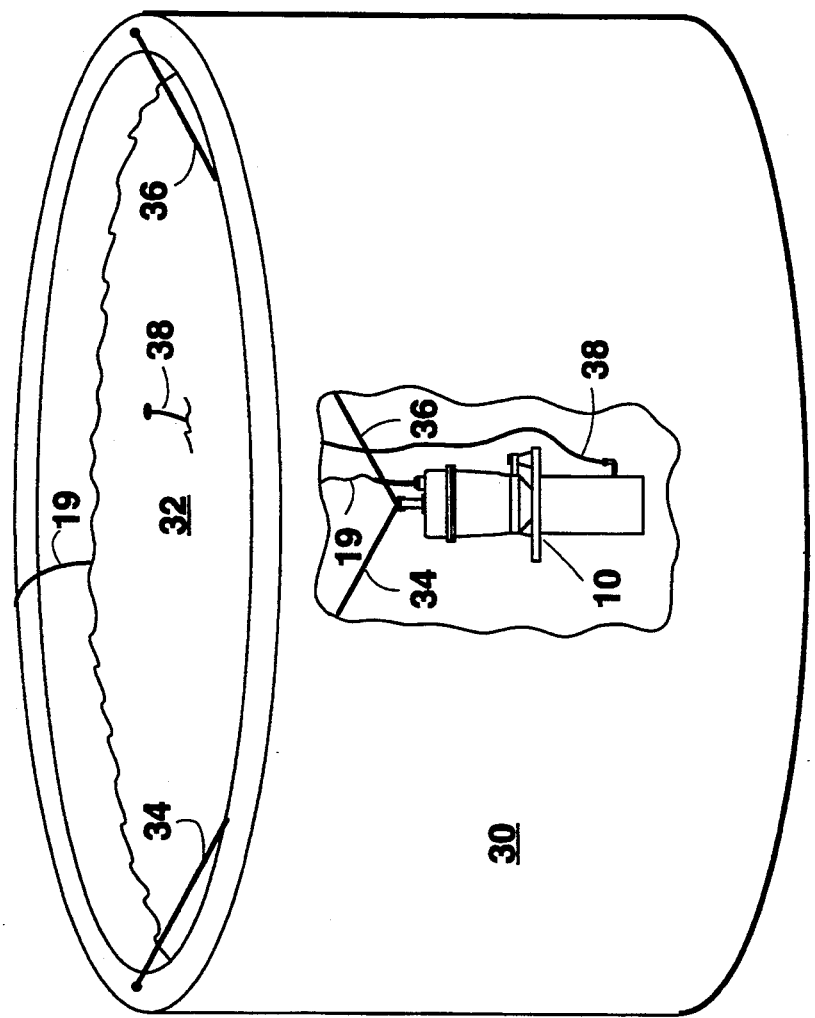

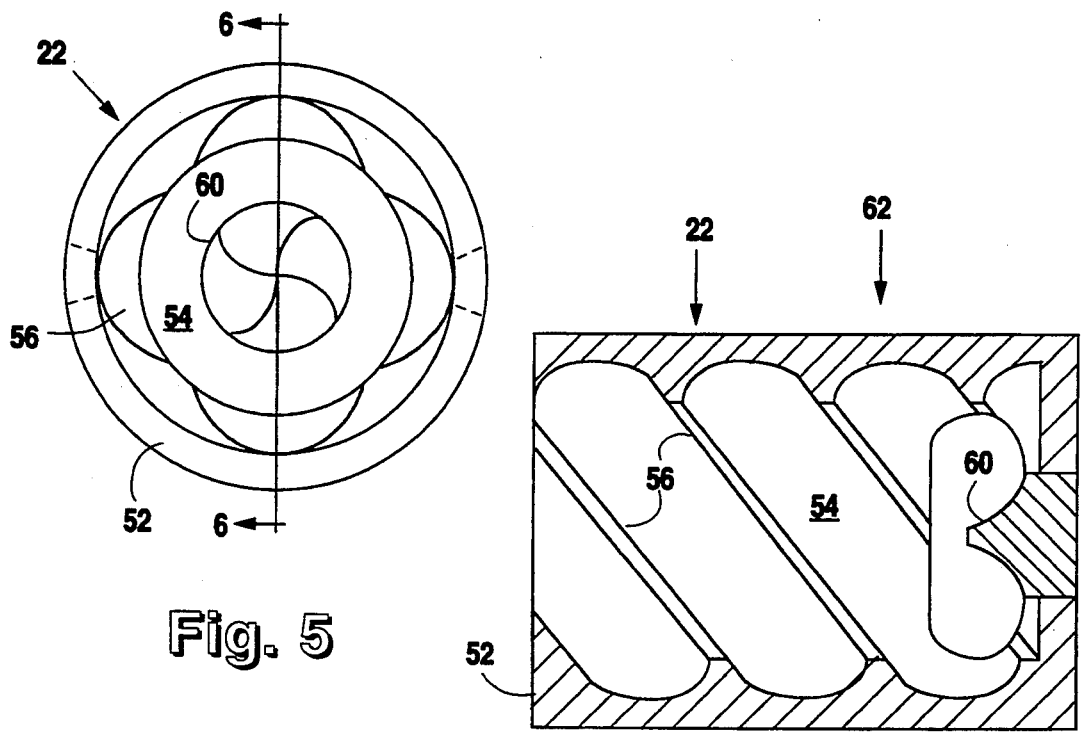
Fig. 5
Fig. 6
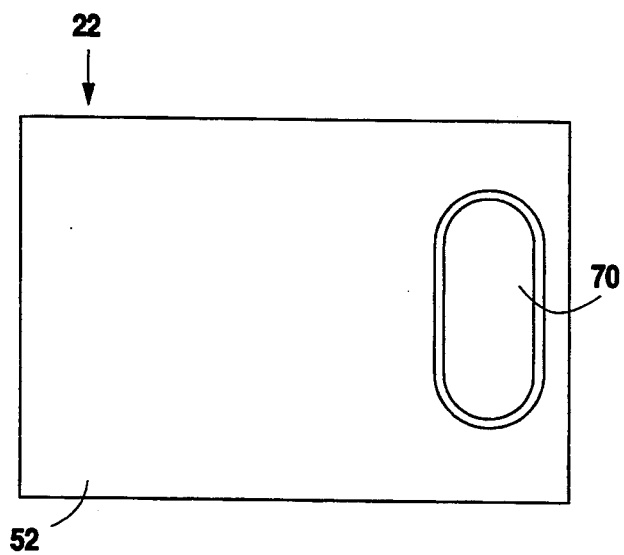
Fig. 7
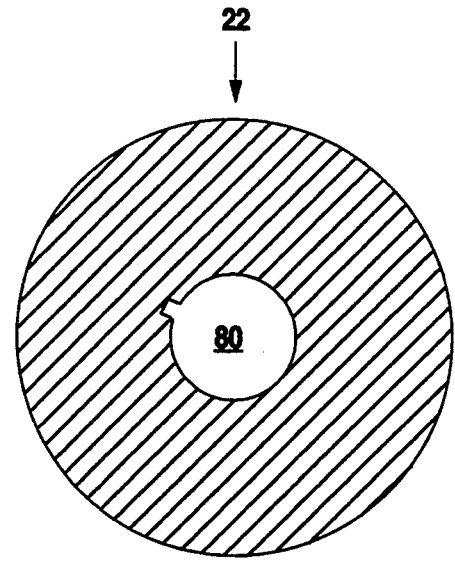
Fig. 8

LOW PRESSURE PROCESS FOR ENTRAINING GAS INTO LIQUID SOLUTION AND PUMP THEREFORE

This is a continuation of my application Ser. No. 07/805,182, filed on Dec. 9, 1991, and entitled "Low Pressure Process For Entraining Gas Into Liquid Solution", now abandoned.

BACKGROUND OF THE INVENTION

1. Field of the Invention

This invention pertains to a method and apparatus for entraining gases into a liquid solution. More specifically, the invention is a method and apparatus for entraining gases such as chlorine into wastewater to facilitate wastewater treatment.

DESCRIPTION OF THE PRIOR ART

It has long been known that entrainment of gas into wastewater facilitates wastewater treatment by either introducing and mixing chemicals or stimulating aerobic activity and therefore contaminant breakdown. The current approach is to circulate the wastewater in a containment tank and through an entrainment apparatus placed in the tank. The entrainment apparatus generally consists of a pump and a means for aspirating the gas into the liquid solution at some point downstream of the pump.

The principle of operation in this approach derives from Bernoulli's Principle, wherein the pressure exerted by a fluid is inversely proportional to the velocity of fluid flow. Thus, the liquid is pumped through a venturi in the entrainment apparatus where the velocity of the fluid is greater and the relative pressure of the fluid is lowered. When the liquid solution exits the entrainment apparatus and returns to the circulating wastewater in the tank, velocity decreases markedly and the pressure exerted rises.

As an extension of Bernoulli's Principle, fluid passing through a venturi will reach its point of highest velocity, and hence lowest pressure, at the narrowest point in the venturi. This technique has also been used in the prior art to add an additional pressure zone so that there is a first pressure zone at the neck of the venturi downstream from the pump, a second pressure zone between the venturi exit and the circulating wastewater, and a third pressure zone in the wastewater circulating in the tank.

The manipulation of fluid flow to control pressure and enhance gas transfer efficiency in the entrainment process as practiced in the prior art nevertheless contains many deficiencies. The primary deficiency arises from introduction of the gas downstream of the pump because of the increase in absolute pressure downstream of the pump that inherently arises from the pump's use. Therefore, although introduction downstream of the pump benefits from a lower relative pressure, the effective absolute pressure is much higher and the entrainment process much less efficient.

It is therefore a feature of this invention to provide an improved process and apparatus wherein the gas is introduced into the liquid solution upstream of the pumping means and therefore at the point of lowest absolute pressure.

It is also a feature of this invention to provide an improved process and apparatus wherein the gas is introduced into the liquid solution at the narrowest point of a venturi upstream of the pump to further lower the absolute pressure at which the gas is introduced.

It is a still further feature of this invention to provide an improved process and apparatus wherein the gas is introduced in the form of bubbles that are as small as mechanically possible at the point of lowest absolute pressure in the system.

It is a still further feature of this invention to provide an improved process and apparatus that utilizes recovering fluid pressure downstream of the venturi to facilitate entrainment.

SUMMARY OF THE INVENTION

The invention is a method for entraining gas in a liquid solution and an apparatus for practicing the method. In the method of the invention, gas is introduced into a liquid solution being pumped through a conduit at the point of lowest absolute pressure in the system upstream of the pumping means. The gas is introduced into the liquid as bubbles or gas pockets with as small a diameter as is mechanically possible at the narrowest point of a venturi in the conduit and the increasing liquid pressure in the system downstream of the venturi is utilized to compress the bubbles still further. The bubbles or pockets of gas are prevented from coalescing as they pass through the pumping means and exit the apparatus by the pumping means itself. The apparatus comprises a conduit having a passageway therethrough in which a venturi is formed. An annular chamber is provided in the body of the conduit at the narrowest point of the venturi where the gas is introduced into the liquid. The gas is introduced upstream of a pumping means, which utilizes a shear force to prevent the bubbles from coalescing as the liquid exits the apparatus through the pumping means.

A BRIEF DESCRIPTION OF THE DRAWINGS

A more particular description of the invention briefly summarized above can be had by reference of the exemplary preferred embodiments illustrated in the drawings of this specification so that the manner in which the above cited features, as well as others that which will become apparent, are obtained and can be understood in detail. The drawings nevertheless illustrate only typical, preferred embodiments of the invention and are not to be considered limiting of its scope as the invention will admit to other equally effective embodiments.

IN THE DRAWINGS

FIG. 3 illustrates the deployment of the apparatus of FIGS. 1-2 in a tank holding wastewater for treatment;

FIG. 4 illustrates the operation of the apparatus in FIGS. 1-2 in the environment illustrated in FIG. 3;

FIG. 5 is an end view of the preferred pumping means of the apparatus of the invention;

FIG. 6 is a longitudinal, cross-sectional view of pumping means of FIG. 5 along line 6—6 of FIG. 5;

FIG. 7 is a longitudinal view of the pumping means of FIG. 5; and

FIG. 8 is a second end view of the pumping means of FIG. 5.

DESCRIPTION OF THE PREFERRED EMBODIMENT

Figure 1:
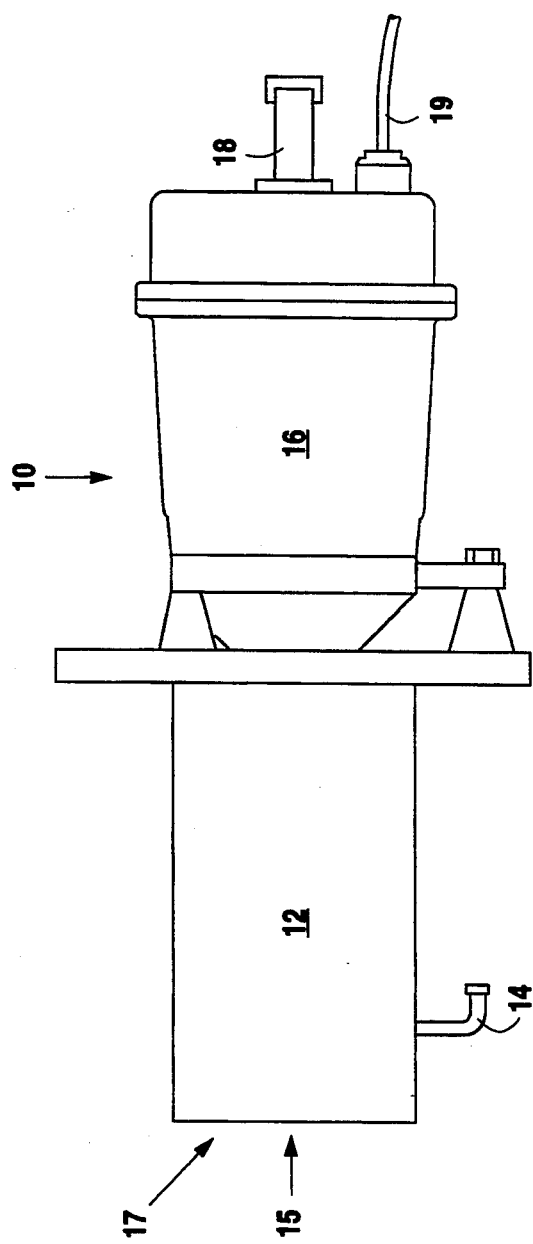
FIG. 1 is a side view of the apparatus of the invention in one embodiment.
Figure 2:
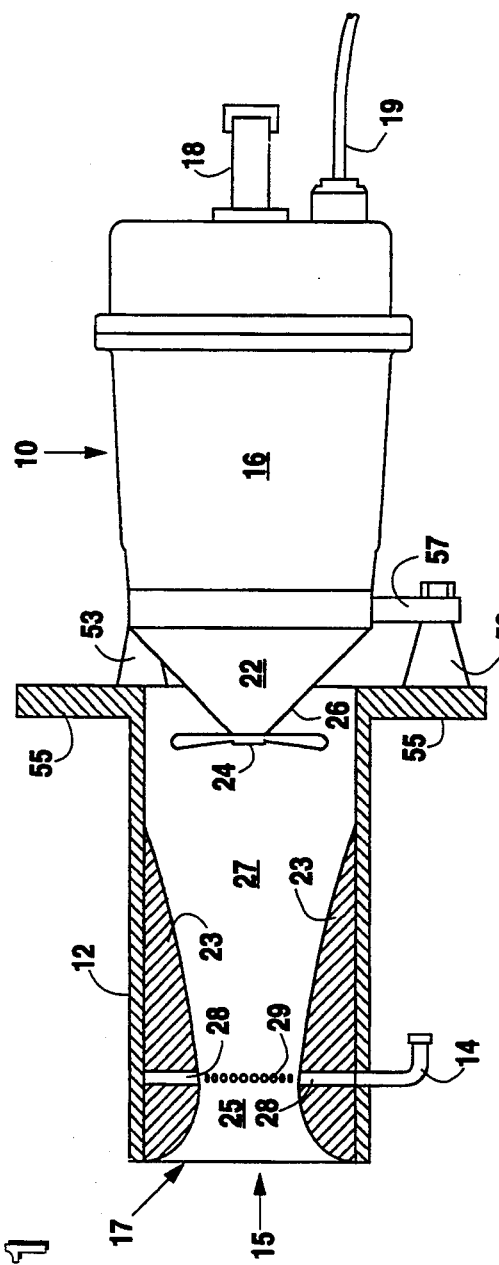
FIG. 2 is a partial cut-away of the apparatus in FIG. 1.

The apparatus of the invention, generally denoted 10, is illustrated in FIGS. 1–2. Apparatus 10 in FIG. 1 generally comprises conduit 12 having entry 17 and vacuum tube 14, conduit 12 being fixedly mounted to motor 16 as is shown. Motor 16 is operated by electrical power provided via cord 19, is transported and maneuvered with handle 18, and may be any one of several well known in the art to be suitable for this type of application. Motor 16 in the preferred embodiment is manufactured by Ebara and sold to the general public as Model No. 50EY3U6.4.

As shown in the cross-sectional view of the apparatus in FIG. 2, conduit 12 has passageway 27 therethrough in which venturi 25 is formed by interior wall 23 of conduit 12. Annular chamber 28 is formed in interior wall 23 of conduit 12 and is fluidly connected to passageway 27 at the narrowest point of venturi 25 via plurality of aspirating openings 29. Each of plurality of aspirating openings 29 is as small as is mechanically possible and in the preferred embodiment, each opening is 0.075 inches in diameter. It is furthermore desirable that as many such openings as is mechanically possible be used. Annular chamber 28 is also fluidly connected to a source of gas via vacuum tube 14.

Pumping means 26 comprising body 22 and impeller 24 in the embodiment of FIGS. 1–4 is an axial flow centrifugal pump and is powered via cord 19 and an electric motor housed in body 16. Conduit 12 is fixedly mounted to body 16 by legs 53 extending from flange 55 of conduit 12, which legs are in turn bolted to flange 57 of body 16. Conduit 12 is mounted to body 16 so that pumping means 22 is mounted at least partially in passageway 27 of conduit 12 to draw fluid in the direction of arrow 15 at entry 17 to passageway 27 and past venturi 25.

FIG. 3 illustrates the apparatus as it is deployed to practice the method of the invention. Apparatus 10 is suspended in wastewater 32 held in containment tank 30 by supporting cables 34 and 36. Power cord 19 runs from apparatus 10 to a power source not shown. Vacuum tube 14 is connected to extension 38 which runs to the surface of wastewater 32 to provide a fluid connection with the ambient atmosphere.

The operation of apparatus 10 as deployed in FIG. 3 is illustrated in FIG. 4. Wastewater 32 is drawn into conduit 12 through entry 17 at point 40 by pumping means 22. Wastewater 32 then flows through venturi 25 at point 42. Gas from the ambient atmosphere is drawn through extension 38 and vacuum tube 14 into annular chamber 28 (shown in FIG. 2) by the flow of wastewater 32 through venturi 25 and is aspirated into wastewater 32 through plurality of aspirating openings 29 (also shown in FIG. 2) at point 42, the narrowest point of venturi 25. As passageway 17 through conduit 12 widens downstream of point 42 the recovering liquid pressure resulting from decreased fluid velocity operates on the bubbles or gas pockets aspirated into wastewater 32 at point 42 to compress them.

The compressed bubbles then pass through pumping means 22 at point 44. Pumping means 22 is especially designed to impart a shearing force to the bubbles in wastewater 32 as is discussed both above and below. This shearing force operates to prevent the bubbles from coalescing to form larger gas pockets and further compresses the bubbles. Wastewater 32 then exits conduit 12 as shown in FIG. 4 to return to the general circulating body of wastewater 32 held in tank 30 at point 46.

The overall effect of the operation of apparatus 10 is to create a general circulating effect in wastewater 32 held in tank 30 shown in FIG. 3. The fluid flow velocity at point 46 is nevertheless much lower than at any point in conduit 12 and, hence, the fluid pressure much higher. Wastewater 32 therefor flows from a zone of high pressure at point 46 to progressively lesser zones of pressure at points 40, 42, and 44, before returning to point 46 and the higher pressure. Gas bubbles introduced at point 42 are therefore acted upon by progressively increasing pressures to facilitate entrainment of the gas into the liquid to produce a super-saturated solution.

The embodiment of pumping means 22 preferred over that shown in FIGS. 1–4 is illustrated in FIGS. 5–8. However, pumping means 22 may be any means for imparting kinetic energy to wastewater 32 as it passes through apparatus 10, such as the axial flow centrifugal pump (i.e., pumping means 22) of FIGS. 1–4. Pumping means 22 should also impart a shearing force to prevent the bubbles from coalescing and to compress their size. In its preferred embodiment (shown in FIGS. 5–8), however, pumping means 22 comprises body 52 having recess 54 therein. In the wall of recess 54 is formed helical screw 56. Pumping means 22 is fixedly mounted to the rotating shaft (not shown) of the electric motor housed in body 16 (shown in FIGS. 1–4) by nut 60 as the end of the shaft extends through aperture 80 in one end of pumping means 22.

Body 52 is thereby rotated at a controlled speed in a manner well known to those in the art and helical screw 56 in recess 54 imparts kinetic energy to the liquid flowing therethrough. A shearing force is also imparted to prevent bubbles from coalescing and to compress them. Slot 70 is cut in the wall of body 52 and recess 54 to fluidly connect recess 54 with the environment external to body 52 so that liquid pumped through recess 54 can exit.

Other variations will become readily apparent to those in the art having the benefits of the teachings herein. For instance, the preferred embodiment of pumping means 22 can be adapted to impart still more kinetic energy by forming a helical screw in exterior wall 62 of body 52. This could be further extrapolated by rotating body 52 within a jacket also having a screw formed in the interior wall thereof, and still further by rotating the jacket within a housing also having a screw formed in the recess therein. Helical screw 56 may also be replaced by a segmented helical screw or an inclined paddle and still perform satisfactorily. It is also anticipated that gas permeable membrane technology will someday be sufficiently advanced that such a membrane may be used to replace plurality of aspirating openings 29 in the preferred embodiment. It will also be recognized that the present invention can be generalized to entrain most gases into most liquids and not only for entraining ambient atmosphere into wastewater. These and other such modifications and variations on the preferred embodiment are to be considered within the scope and spirit of the invention disclosed and claimed herein.

What is claimed is:

1. A method for entraining a gas in a liquid solution comprising the steps of:

pumping a liquid through a conduit having a passageway therethrough, the conduit having means for pumping situated at least partly in the passageway downstream of a venturi in the passageway, the means for pumping comprising:
- a powered means having a rotatable shaft; and
- a body having a recess in which a means for imparting kinetic energy is formed and at least one opening in the wall of the body to permit the liquid pumped through the recess by the imparting means to exit the recess, said body being mounted to the rotatable shaft of said powered means;

introducing the gas into the liquid as bubbles at the narrowest point of the venturi;

utilizing the recovering liquid pressure to reduce the size of the bubbles introduced at the narrowest point of the venturi; and preventing the bubbles from coalescing as they pass through the pumping means.

2. The pumping means of claim 1 wherein the imparting means is at least one of a helical screw, a segmented helical screw, and an inclined paddle.

3. The method of claim 1, wherein the step of preventing the bubbles from coalescing is performed by the pumping means.

4. The pumping means of claim 3, wherein the imparting means is at least one of a helical screw, a segmented helical screw, and an inclined paddle.

5. The method of claim 1, wherein the bubbles have a diameter of 0.075 inches when introduced.

6. The method of claim 1, including increasing the liquid pressure downstream from the pumping means to further facilitate entrainment of the bubbles into the liquid.

7. An apparatus for entraining a gas in a liquid solution comprising:
- a conduit having a passageway including a venturi therethrough;
- means for introducing the gas into the liquid as bubbles at the narrowest point of the venturi;
- means for providing gas to the gas introducing means; and
- means for pumping liquid through said conduit positioned partly in said conduit downstream of the venturi, the means for pumping comprising:
  - a powered means having a rotatable shaft; and
  - a body having a recess in which a means for imparting kinetic energy is formed and at least one opening in the wall of the body to permit the liquid pumped through the recess by the imparting means to exit the recess, said body being mounted to the rotatable shaft of said powered means.

8. The apparatus of claim 7, wherein said gas introducing means comprises an annular chamber in said conduit, the annular chamber being in fluid communication with the passageway via a plurality of spaced apart openings in the wall of the conduit at the narrowest point of the venturi.

9. The pumping means of claim 7, wherein the imparting means is at least one of a helical screw, a segmented helical screw, and an inclined paddle.

10. The apparatus of claim 7 or claim 8, wherein the gas providing means is a vacuum tube between the gas introducing means and a source of gas.

11. The apparatus of claim 7, wherein the pumping means prevents coalescence of bubbles introduced into the liquid.

12. The pumping means of claim 11, wherein the imparting means is at least one of a helical screw, a segmented helical screw, and an inclined paddle.

13. The apparatus of claim 7 wherein the pumping means facilitates compression of the introduced bubbles into the liquid.

14. The pumping means of claim 13, wherein the imparting means is at least one of a helical screw, a segmented helical screw, and an inclined paddle.

15. An apparatus for entraining a gas in a liquid solution comprising:
- a conduit having a passageway therethrough, the passageway including a venturi, and having an annular chamber in fluid communication with the passageway via a plurality of spaced apart openings in the wall of the conduit at the narrowest point of the venturi;
- a vacuum tube in fluid communication with the annular chamber;
- a pump located at least partly in the passageway of said conduit downstream of the venturi, said pump comprising:
  - a powered means having a rotatable shaft; and
  - a body having a recess in which a means for imparting kinetic energy is formed and at least one opening slot in the wall of the body to permit liquid pumped through the recess by the imparting means to exit the recess, said body being mounted to the rotatable shaft of said powered means.

* * * * *